INVENTOR
Ferdinand Kruse
BY
ATTORNEYS.

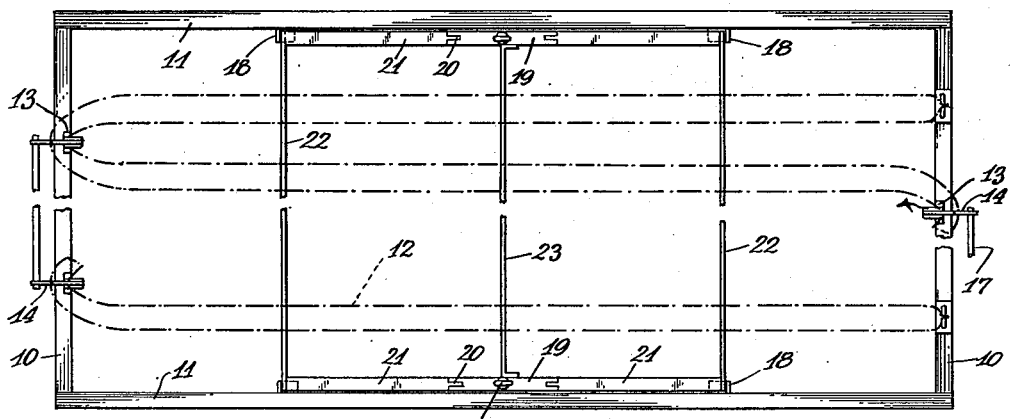
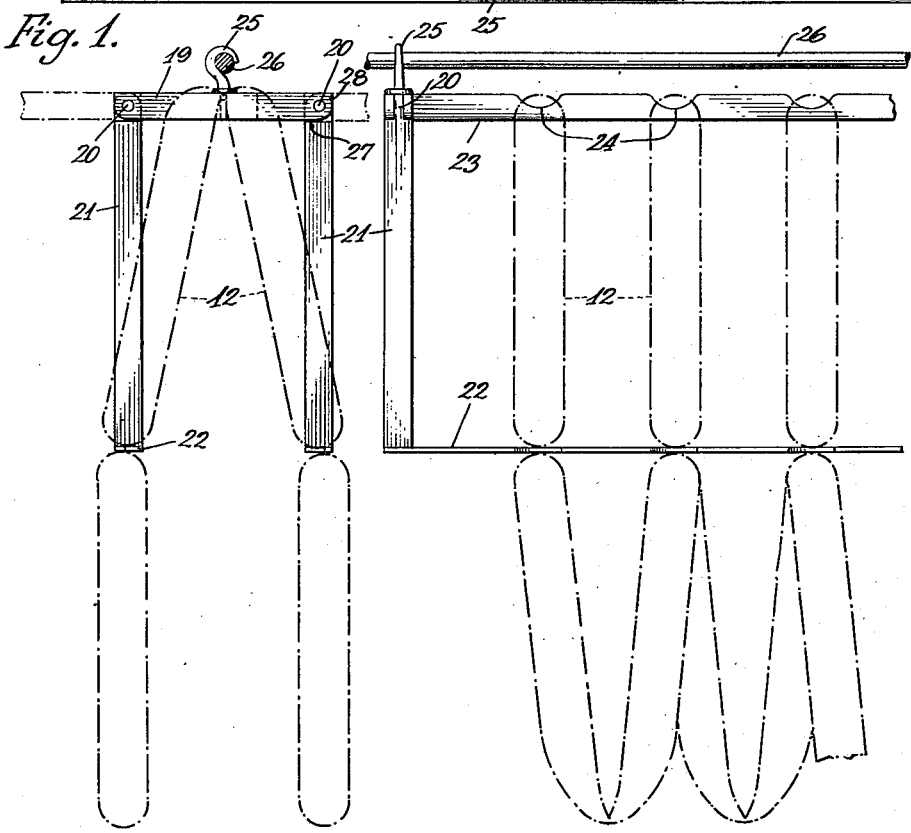

Patented June 19, 1923.

1,459,067

UNITED STATES PATENT OFFICE.

FERDINAND KRUSE, OF PORT RICHMOND, NEW YORK.

SAUSAGE-TWISTING MACHINE.

Application filed November 18, 1922. Serial No. 601,794.

*To all whom it may concern:*

Be it known that I, FERDINAND KRUSE, a citizen of the United States, residing at Port Richmond, county of Richmond, and State of New York, have invented certain new and useful Improvements in Sausage-Twisting Machines, of which the following is a specification.

The principal object of this invention is to improve upon certain details of construction of sausage twisting machines of the type shown in my copending application for Patent Serial No. 595,889, wherein is disclosed a machine having a plurality of endless belts arranged in horizontally aligned longitudinal series at the sides of which former elements are placed to constrict the sausage casing at selected points. The sausage casings are threaded in and around a removable separate frame upon the work bench, which frame is provided with means to hold the casings in positions corresponding to the spaces between adjacent belts and the frame after the casings have been placed thereon is placed upon a lifting carriage mounted upon the machine for vertical movement and by means of which the casings are lowered between the vertically extending reaches of the belts and between the former elements for the twisting operation.

Considered in its more specific aspects one of the objects of this invention is to improve upon the structure of the main removable frame and to incorporate therewith an auxiliary detachable hinged central portion which can be readily lifted from the removable frame to remove the twisted sausages therefrom in a conveniently arranged spaced relationship for placing in the smoke house.

An objectionable feature of the machine disclosed in the aforementioned application which frequently caused a failure of the belts of the outside series to twist the sausages, which was caused by the arrangement of the belt rollers permitting a slackness in the outer edges of the belts whereby the casings would drag against the brackets for holding the belt idler rolls. A further object of the present invention is to provide a construction to obviate this defect.

Another object is to improve upon the construction of the end formers and the manner of mounting them upon the frame.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Fig. 1 is a plan view partly broken away of the removable frame showing detachable central portion.

Fig. 2 is a side view of the detachable central portion in its folded position.

Fig. 3 is a front view of the structure shown in Fig. 2.

Figure 6:
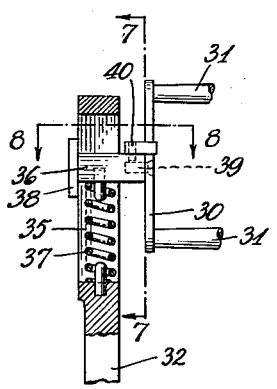
Figure 7:
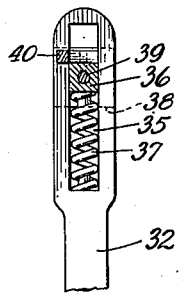
Figure 8:

Fig. 6 is a sectional detail of the spring mounting for the idler roll frame and Figs. 7 and 8 are sections on the lines 7—7 and 8—8 respectively of Fig 6.

Referring to Figs. 1 to 4 inclusive, the numerals 10 indicate the side bars and the numerals 11 the end bars of a removable frame upon which the sausage casing 12 is threaded as indicated in the dotted lines in Fig. 1. Pivotally mounted on brackets 13 at equally spaced intervals along the side bars 10 are a plurality of end formers 14 having their outer ends formed into a reduced hook like portion 15 which forms with the widened portion 16 of the former a substantially V shaped opening 17' in which the sausage casing is received and contracted during the twisting operation. The outer ends of the widened portions 16 are apertured to receive a rod 17 which extends longitudinally in parallelism with the bars 10 and furnishes a handle by means of which all the end formers upon each side are simultaneously actuated from the full line position shown in Fig. 4 to the dotted line position and permit the casings to be readily removed from the frame after the twisting operation is completed.

The end bars 11 are provided with the angle brackets 18 which furnish supports for the detachable central portion of the frame. This central portion comprises a pair of end bars, each of which is formed of a central piece 19 to the ends of which is hinged as at 20 a folding bar 21, the outer ends of the folding bars being connected by the side rods 22 and a central rod 23 being secured to and connecting the central pieces 19. Each of the bars 22 and 23 are provided with a plurality of equally spaced notches or recesses 24 in which the sausage casing is received when threaded upon the removable frame. A hook 25 is secured substantially at the central point of each of the central pieces 19 and is used as a means to suspend the detachable central portion from the rods 26 within the smoke house.

When the twisting of the sausages has been completed in the twisting machine, the main removable frame is removed from the machine and placed upon the work bench the auxiliary detachable frame is then raised out of the main frame, the folding bars 21 and side rods 22 dropping to the position shown in Figs. 2 and 3, in which position the casings will be supported by the central rod 23 and the casings being held in spaced relationship by the notches or recess 24. The hinges 20 are constructed to form stop shoulders 27 and 28 to limit the folding and opening movements respectively of the auxiliary frame as shown in Fig. 2.

When an auxiliary frame is to be inserted into the main removable frame the folding bars are moved upwardly to the dotted line position shown in Fig. 2, and the auxiliary frame is then placed within the main frame as shown in Fig. 1 in position to receive the sausage casings.

Figure 4:
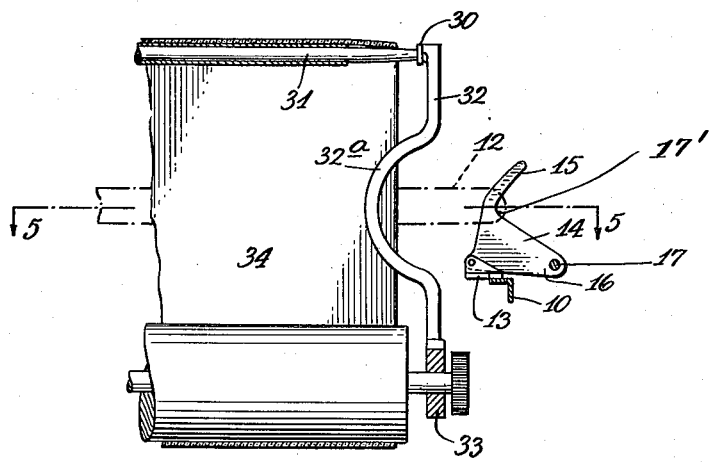
Fig. 4 is a sectional detail of the improved belt idler roll bracket.
Figure 5:
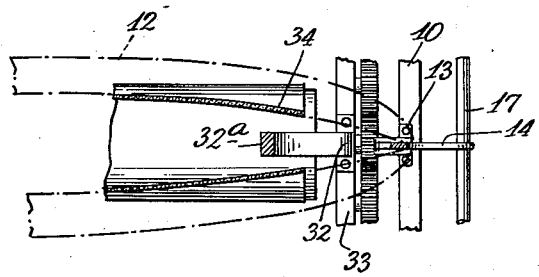
Fig. 5 is a section on the line 5—5 of Fig. 4.

Referring to Figs. 4 and 5, the idler roll frames 30, upon which idler rolls 31 are mounted, are supported by a bracket 32, which is secured upon the side frame 33 of the twisting machine. Each of the brackets 32 are bent or curved inwardly as at 32ª within the space between the reaches of the belt, 34. The sausage casing when placed into the machine will normally occupy a position substantially the same as shown in Fig. 4, so that it will lie in alignment with the inwardly curved portion 32ª. Because of the construction of the idler rolls 31, there is a certain degree of slackness of the belts at the sides thereof, hence when the casings are twisted the tension or pressure of the casings against that portion of the belts, adjacent the sausage will cause the belt to occupy the position shown in Fig. 5 and as the brackets 32 extend inwardly beyond the outer edges of the belts, the casings are prevented from dragging on the brackets thereby insuring complete contact of the belts and casings and the twisting of the sausages.

As shown in Figs. 7 and 8 the upper end of the brackets 32 are provided with an elongated slot 35 in which a journal box 36 is slidably mounted, a compression spring 37 being mounted within the slot to normally urge the journal box 36 to the upper end of the box. The outer side of the journal box 36 is flanged as at 38 to retain the box within the slot while its inner side is provided with a bore in which is rotatably received a pin 39 projecting from the central part of the side of the idler roll frame 30.

A stop piece 40 is secured upon the journal box to limit the rotation of the idler roll frame and hold it in either a horizontal or vertical position. The vertical position of the frame holding the belts in open or in operative relationship and the horizontal position holding the belts in closed or operative position as disclosed more fully in the aforementioned co-pending application.

Having thus described my invention, what I claim as new and desire to secure by Letters Patent, is:

1. In a sausage twisting machine of the type wherein a plurality of endless belts and former elements are provided to twist into a plurality of links, a sausage casing which is threaded back and forth through the machine, characterized by a main removable frame upon which the sausage casings are threaded back and forth preparatory to inserting them into the machine, said frame having a detachable auxiliary frame portion upon which the twisted sausage may be removed to a smoke house.

2. In a sausage twisting machine of the type wherein a plurality of endless belts and former elements are provided to twist into a plurality of links a sausage casing which is threaded back and forth through the machine, characterized by a main removable frame upon which the sausage casings are threaded back and forth preparatory to inserting them into the machine, said frame having a detachable foldable auxiliary frame portion upon which the twisted sausage may be removed to a smoke house.

3. In a sausage twisting machine of the type wherein a plurality of endless belts and former elements are provided to twist into a plurality of links a sausage casing which is threaded back and forth through the machine characterized by a main removable frame upon which the sausage casings are threaded back and forth preparatory to inserting them into the machine, said frame having a detachable auxiliary frame portion upon which the twisted sausage may be removed to a smoke house, said auxiliary frame portion being provided with means to hold the sausages in spaced relationship.

4. In a sausage twisting machine of the type wherein a plurality of endless belts and former elements are provided to twist into a plurality of links a sausage casing which is threaded back and forth through the machine characterized by a main removable frame upon which the sausage casings are threaded back and forth preparatory to inserting them into the machine, said frame having a detachable auxiliary frame portion comprising side members consisting of a central portion, a pair of end portions pivotally connected to said central portion, and bars connecting said central and end portions.

5. In a sausage twisting machine of the type wherein a plurality of endless belts and former elements are provided to twist into a plurality of links a sausage casing which is threaded back and forth through the machine characterized by a main removable frame upon which the sausage casings are threaded back and forth preparatory to inserting them into the machine, said frame having a detachable auxiliary frame portion comprising side members consisting of a central portion, a pair of end portions pivotally connected to said central portion and bars connecting said central and end portions, said bars provided with means to hold the sausages in spaced relationship.

6. In a sausage twisting machine of the type wherein a plurality of endless belts and former elements are provided to twist into a plurality of links a sausage casing which is threaded back and forth through the machine characterized by a main removable frame upon which the sausage casings are threaded back and forth preparatory to inserting them into the machine, said frame having a detachable auxiliary frame portion upon which the twisted sausage may be removed to a smoke house and said auxiliary frame being provided with means to suspend the same in the smoke house.

7. In a sausage twisting machine of the type wherein a plurality of endless belts and former elements are provided to twist into a plurality of links a sausage casing which is threaded back and forth through the machine, characterized by a main removable frame upon which the sausage casings are threaded back and forth preparatory to inserting them into the machine, said frame having a detachable auxiliary frame portion comprising side members consisting of a central portion and a pair of end portions hinged thereto whereby said frame may be folded into a compact closed position, bars connecting said central and end portions provided with means to hold the sausages in spaced relationship and said central and end portions of said side members being provided with cooperating stop means to limit the opening and closing movements of said auxiliary frame.

8. In a sausage twisting machine, driving and idler rolls, an endless belt trained about said rolls and a bracket to support said idler rolls constructed and arranged to be overlapped by said driving belt whereby contact of the sausage casing with said bracket is prevented.

9. In a sausage twisting machine, a driving roll, an idler roll frame, a pair of idler rolls mounted on said frame, an endless belt trained about said idler and driving rolls, a bracket to support said idler roll frames, and resilient means to support said idler roll frame upon said bracket and maintain said belt under tension.

10. In a sausage twisting machine, a driving roll, a idler roll frame, a pair of idler rolls mounted on said frame, an endless belt trained about said idler and driving rolls, a bracket, having an elongated slot therein, a journal box in which said idler roll frame is rotably mounted slidably mounted within said slot, and resilient means to normally urge said journal box and idler roll frame away from said driving roll to hold said driving belt under tension.

In testimony whereof I have affixed my signature.

FERDINAND KRUSE.